United States Patent [19]
Yanagioka et al.

[11] Patent Number: 5,645,802
[45] Date of Patent: Jul. 8, 1997

[54] METHOD AND APPARATUS FOR THE TREATMENT OF A WASTE GAS CONTAINING DISTS AND CHEMICAL CONTAMINANTS

[75] Inventors: Hiroshi Yanagioka, Yokohama; Yoshio Ogawa, Tokyo; Yoshiaki Komatsubara, Tokyo; Kenji Kobayashi, Yokohama, all of Japan

[73] Assignee: Chiyoda Corporation, Japan

[21] Appl. No.: 802,184

[22] Filed: Dec. 4, 1991

Related U.S. Application Data

[62] Division of Ser. No. 515,756, Apr. 30, 1990, Pat. No. 5,120,518.

[30] Foreign Application Priority Data

May 2, 1989 [JP] Japan ................... 1-112861

[51] Int. Cl.$^6$ ................................................. B01D 50/00
[52] U.S. Cl. ..................... 422/170; 261/77; 261/115
[58] Field of Search ............. 422/170; 261/18.1, 261/77, 115, 121.1, 126; 55/223, 244, 256

[56] References Cited

U.S. PATENT DOCUMENTS

| | | | |
|---|---|---|---|
| 4,251,486 | 2/1981 | Sohda | 422/170 |
| 4,419,331 | 12/1983 | Montalvo | 422/170 |
| 4,540,162 | 9/1985 | Gozlan | 422/170 |
| 4,898,720 | 2/1990 | Glindsjo | 422/170 |
| 4,986,966 | 1/1991 | Letto | 422/170 |

*Primary Examiner*—Timothy McMahon
*Attorney, Agent, or Firm*—Lorusso & Loud

[57] ABSTRACT

A method and apparatus for the treatment of a waste gas containing dust and chemical contaminants are disclosed. The apparatus includes a combination of a cooling/dust-eliminating chamber and a chemical treatment chamber in a single container. The first mentioned chamber is provided with sprayers for the cooling liquid, a perpendicular bulkhead or pipes, a collecting plate for the cooling liquid and gas-dispersing pipes in a special configuration, so that the dust-liquid separation can be efficiently effected without badly affecting the chemical treatment of the gas. Thus, the apparatus can be minimized in size as a whole and made economically attractive.

8 Claims, 7 Drawing Sheets

METHOD AND APPARATUS FOR THE TREATMENT OF A WASTE GAS CONTAINING DISTS AND CHEMICAL CONTAMINANTS

This application is a division of application Ser. No. 07/515756, field Apr. 30, 1990, now U.S. Pat. No. 5,120,518.

BACKGROUND OF THE INVENTION

1. Field of the Invention:

The present invention relates to a method and apparatus for the treatment of a waste gas containing dust and chemical contaminants. More particularly, the present invention relates to a method for cooling, dust-elimination and desulfurization of waste gases exhausted from various industrial plants as well as an apparatus for the cooling/dust-elimination and the chemical treatment, especially, desulfurization of waste gases exhausted from various industrial plants. The present invention thus provides a method and apparatus wherein a cooling/dust-eliminating device and a chemical treating device for a waste gas are integrally combined in a smaller size as a whole for attaining the treatment of the waste gas efficiently.

2. Description of the Prior Art

In prior art wet processes for desulfurizing waste gas, it is indispensable to cool the waste gas prior to the desulfurization step wherein sulfur oxide compounds are eliminated by absorption. In the prior art desulfurization apparatus, therefore, a dust-eliminating column where a circulation pump for a cooling liquid is employed is installed apart from the main desulfurization apparatus where sulfur oxide compounds are reacted and absorbed in an absorption liquid, and the cooling and dust-elimination of the waste gas are carried out in that column prior to the desulfurization. As a result of provision of such device, the apparatus for such desulfurization becomes larger as a whole and expenses for facilities and operation for the apparatus are accordingly increased. With a view to omitting such a separate dust-eliminating column, the present inventors previously proposed a method for obtaining a purged waste gas wherein a high temperature waste gas is brought into contact, in a desulfurization device for reactively absorbing sulfur dioxide, with microparticles of a cooling liquid and microparticles of an absorbing liquid to capture contaminants contained in the waste gas with these liquid microparticles while cooling the waste gas by increasing moisture. Thereafter the cooled waste gas is introduced through gas-dispersing pipes into an absorbing liquid where sulfur dioxide is eliminated by absorption (Japanese Laid-Open Patent Application No. Sho. 64-18427).

However, the above-mentioned method involves a number of problems. Firstly, the waste gas to be introduced into the absorbing liquid contains both microparticles of a cooling liquid and microparticles of an absorbing liquid, and these microparticles containing dust, HCl, HF, Al and the like contaminants removed from the waste gas dilute the absorbing liquid. Further, incorporation of these contaminants into the absorbing liquid causes deterioration of the quality of desulfurization by-products, for example, gypsum. What is more, the desulfurization performance itself of the apparatus is badly influenced by dilution of the absorbing liquid with the microparticles of the cooling liquid. Consequently, that prior art method was not completely satisfactory in these respects. So long as this point is not as yet improved, the waste gas has to be cooled and treated, prior to being introduced into the absorbing liquid, in a separate dust-eliminating device to eliminate the microparticles of a cooling liquid and dust entrained therein. Such a pretreatment is quite troublesome and makes the overall process economically unattractive.

Under these circumstances, there is a great demand to develop a new method and apparatus for the treatment of a waste gas thereby effecting the steps of cooling dust-elimination and chemical treatment of the waste gas efficiently in an apparatus which is smaller in size and capable of carrying out the steps continuously in a simple and economical manner.

BRIEF SUMMARY OF THE INVENTION

Accordingly, it is an object of the present invention to provide a method for the treatment of a waste gas containing dust and chemical contaminants, which overcomes the various drawbacks seen in the prior art methods.

It is another object of the present invention to provide a method for effecting cooling/dust-elimination and a chemical treatment of the waste gas continuously in a simple and economical manner.

It is still another object of the present invention to provide a new apparatus for the treatment of the waste gas, which combines, in a single unit, a cooling/dust-eliminating chamber using a cooling liquid and a chemical treatment chamber using an absorbing liquid in a compact size.

It is a further object of the present invention to provide an apparatus for the treatment of the waste gas, which is operable economically under controllable conditions without permitting any contamination of the absorbing liquid with the dust and cooling liquid, so that clogging of pipelines can be completely prevented.

Other and further objects, features and advantages of the present invention will become more fully apparent from the following description.

It has now been found that a cooling device and a dust-eliminating device can be integrally combined in a single chamber using a unique configuration whereby the apparatus can be constructed as a whole in a smaller size and operated in a simple and economical manner without any trouble during operation. More specifically, the above objects can be attained by spraying or atomizing a cooling liquid as microdroplets or microparticles into a horizontal flow of a waste gas to cool it rapidly, allowing the flow of the waste gas to collide against a perpendicular wall or plural perpendicular pipes to convert the horizontal flow to an ascending flow while capturing dust contained in the waste gas with the microparticles of the cooling liquid, dropping the dust-ladened micorparticles down onto a collecting plate by gravity, thereby separating the dust from the waste gas, and thereafter bringing the cooled and dust-free waste gas into contact with an absorbing liquid thereby absorbing chemical contaminants contained in the waste gas into the absorbing liquid.

DETAILED DESCRIPTION OF THE INVENTION

In accordance with one embodiment of the present invention, there is provided a method for the treatment of a waste gas containing dust and chemical contaminants, which includes a combination of the steps of spraying a cooling liquid as microdroplets into a horizontal flow of a waste gas, converting the flow of the waste gas into an ascending flow while capturing dust contained in the waste gas with the microdroplets of the cooling gas, collecting the dust-ladened microdroplets by gravity thereby separating the dust from the waste gas, collecting the dust-ladened microdroplets of the cooling liquid, and bringing the dust-free waste gas into contact with an absorbing liquid thereby absorbing chemical contaminants contained in the waste gas into the absorbing liquid.

In accordance with another embodiment of the present invention, there is provided an apparatus for carrying out the above method.

In accordance with one embodiment, there is provided an apparatus for the treatment of a waste gas containing dust and chemical contaminants and which includes one or more sprayers capable of spraying a cooling liquid as microdroplets into a flow of a waste gas, a perpendicular wall or plural perpendicular pipes adapted for converting the flow to an ascending flow, a dust-eliminating chamber provided with a collecting plate capable of collecting dust-ladened microdroplets of the cooling liquid, a chemical treatment chamber for the dust-free waste gas for bringing the dust-free waste gas into contact with an absorbing liquid and an effluent pipe for discharging the dust-ladened cooling liquid from the dust-eliminating chamber. In this embodiment, the sprayers are mounted in an inlet for the waste gas and/or in the dust-eliminating chamber which is arranged above the chemical treatment chamber. Between the dust-eliminating chamber and the chemical treatment chamber, there is interposed a horizontal bulkhead which is provided with a number of downwardly extending gas-dispersing pipes providing gas flow communication between the chambers.

In accordance with another embodiment, there is provided an apparatus for the treatment of a waste gas containing dust and chemical contaminants, which includes a dust-eliminating chamber provided with a cylindrical perpendicular bulkhead from the top of the chamber. A collecting plate for collecting cooling liquid is horizontally interposed between the lower end of the cylindrical perpendicular bulkhead and the side wall of the chamber and the side wall of the chamber is provided with an opening to an inlet for a waste gas, the uppermost end of the opening being positioned below the upper end of the cylindrical perpendicular wall while the lowermost end of the opening is positioned above the collecting pate. A chemical treatment chamber for the waste gas is arranged below the dust-eliminating chamber and is filled with an absorbing liquid capable of absorbing chemical contaminants contained in the waste gas. A horizonal bulkhead divides the two chambers and is provided with a number of downwardly extending gas dispersing pipes provided gas communication between the two. The horizontal bulkhead has a central opening through which extends a discharge pipe for the waste gas. The discharge pipe extends upward through the inside of the cylindrical perpendicular bulkhead and passes through the top of the dust-eliminating chamber. One or more sprayers for the cooling liquid are mounted on the inside the gas inlet and/or at positions above the collecting pate. An effluent pipe serves to remove the cooling liquid from the collecting plate.

In accordance with still another embodiment, there is provided an apparatus for the treatment of a waste gas containing dust and chemical contaminants, which apparatus includes a dust-eliminating chamber for the waste gas provided with a perpendicular plate bulkhead, the upper end of which is spaced below the top plate of the chamber. A collecting plate for a cooling liquid is horizontally positioned between the lower end of the perpendicular plate bulkhead and the side wall of the chamber. The side wall of the chamber is provided with an opening, the top of which is lower than the upper end of the perpendicular plate bulkhead and the bottom of which is positioned higher than the collecting plate, the opening serving as an inlet for a waste gas. A chemical treatment chamber is arranged beneath the dust-eliminating chamber and is filled with an absorbing liquid capable of absorbing chemical contaminants contained in the waste gas. A horizontal bulkhead divides the two chambers and is provided with a number of downwardly extending gas-dispersing pipes providing a gas communication between the two chambers. A gas effluent pipe provides an outlet from the upper side wall of the chemical treatment chamber. One or more sprayers for the cooling liquid are mounted inside the gas inlet and/or at positions above the collecting plate. An effluent pipe serves to remove the cooling liquid from the collecting plate.

In accordance with another embodiment, there is provided an apparatus for the treatment of a waste gas containing dust and chemical contaminants, which includes a dust-eliminating chamber for a waste gas provided on a side wall with a gas inlet. A chemical treatment chamber for the waste gas is arranged beneath the dust-eliminating chamber and is provided on its said wall with a gas outlet, the chemical treatment chamber being filled with an absorbing liquid capable of absorbing chemical contaminants contained in the waste gas. A collecting plate for a cooling liquid as horizontally interposed between the two chambers and one or more perpendicular pipes for passage of the dust-free gas extend from the collecting plate upwardly and downwardly. The upper ends of the pipes are positioned above the uppermost end of the gas inlet but are spaced below the top plate of the dust-eliminating chamber. The lower end of the pipes are positioned below the lowermost end of the gas outlet but spaced above the bottom plate of the chemical treatment chamber. The apparatus further includes an inlet for the waste gas, a gas outlet, one or more sprayers for the cooling liquid mounted on the inside of the gas inlet and/or at positions above the collecting plate, and effluent pipe for removing the cooling liquid from the collecting plate.

BRIEF DESCRIPTION OF THE DRAWINGS

The present invention can be more fully understood from tile following description taken in conjunction with the accompanying drawings, in which.

Figure 2:
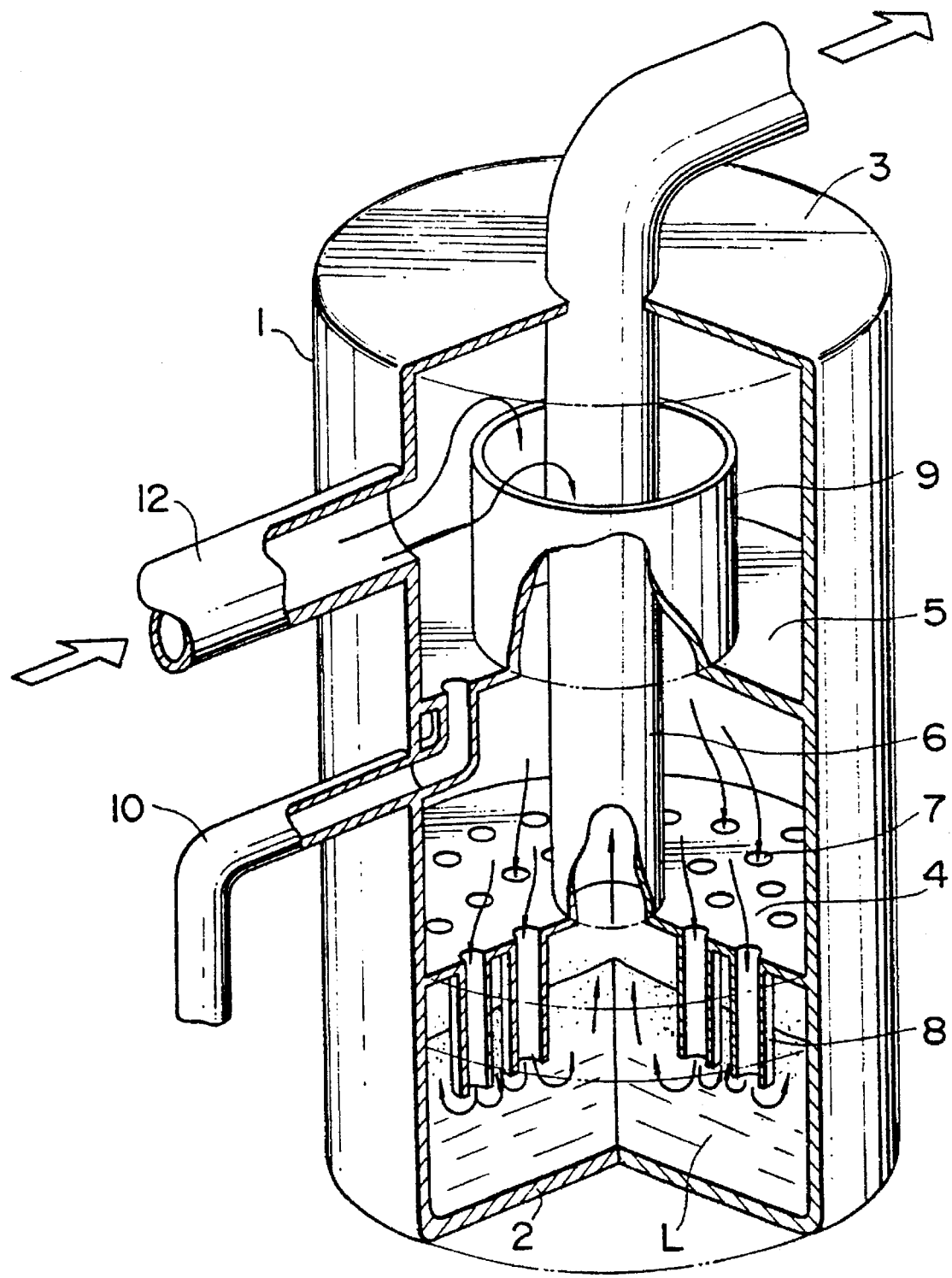
FIG. 2 is a partially cut, perspective view of the main body of the apparatus shown in FIG. 1.
Figure 4:
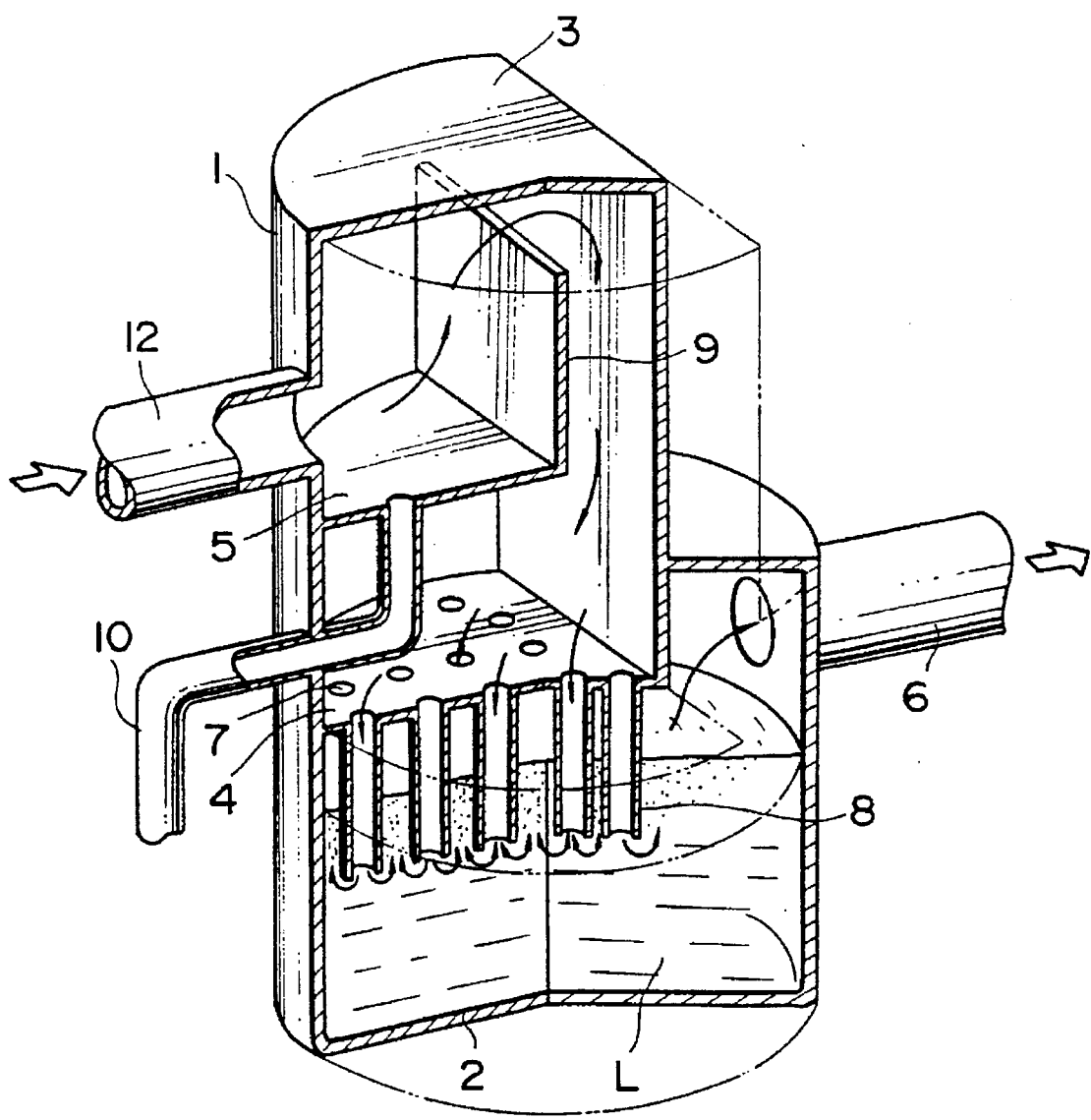
FIG. 4 is a partially cut perspective view of the main body of the apparatus shown in FIG. 3.

By the way, the sprayers or atomizers for the cooling liquid are omitted in FIGS. 2 and 4.

Basically, the apparatus of this invention includes a container or column wherein the upper part is exclusively used for the cooling/dust-eliminating chamber and the lower part is used for the chemical treatment chamber because the separation of the cooling liquid from the waste gas is effected by gravity. In the cooling/dust-eliminating chamber, water is advantageously used as the cooling liquid since water is economical and does not influence the absorbing liquid used in the chemical treatment chamber even if contaminated in a small amount. The absorbing liquid to be charged into the chemical treatment chamber is suitably selected according to the nature of the waste gas. In case the contaminants contained in a waste gas are acidic substances such as $SO_2$, $SO_3$, NO, $N_2O_3$, $NO_2$, $N_2O_4$, $N_2O_5$, HCl, HF, etc., an aqueous solution or slurry of an alkaline substance such as an alkali metal compound, alkaline earth metal compound, etc. can be used as the absorbing liquid. Especially, a slurry of calcium hydroxide or calcium carbonate is particularly preferable as the absorbing liquid. In case of the chemical contaminant in the waste gas being sulfur dioxide, calcium hydroxide or carbonate in a slurry will react with sulfur dioxide and form calcium sulfite. In this case, the calcium sulfite can be converted into commercially valuable gypsum by introducing air or oxygen into the absorbing liquid. Alternatively, if the contaminant contained in a waste gas is a basic substance such as ammonia or an amine, an aqueous solution of an acidic substance such as hydrochloric acid can be used as the absorbing liquid. According to the nature of the contaminant, an alkaline or acidic aqueous solution may be used as the cooling liquid. In any event, both the cooling liquid and the absorbing liquid can be suitably selected according to the nature of the waste gas.

The cooling liquid is sprayed by a sprayer as microdroplets which are convenient for contact with a waste gas. The sprayer for the cooling liquid may be any type of conventional device so far as it can form microdroplets of the cooling liquid. Examples of such sprayers include rotary sprayers, jet sprayers and two-fluid sprayers, etc.

Figure 1:
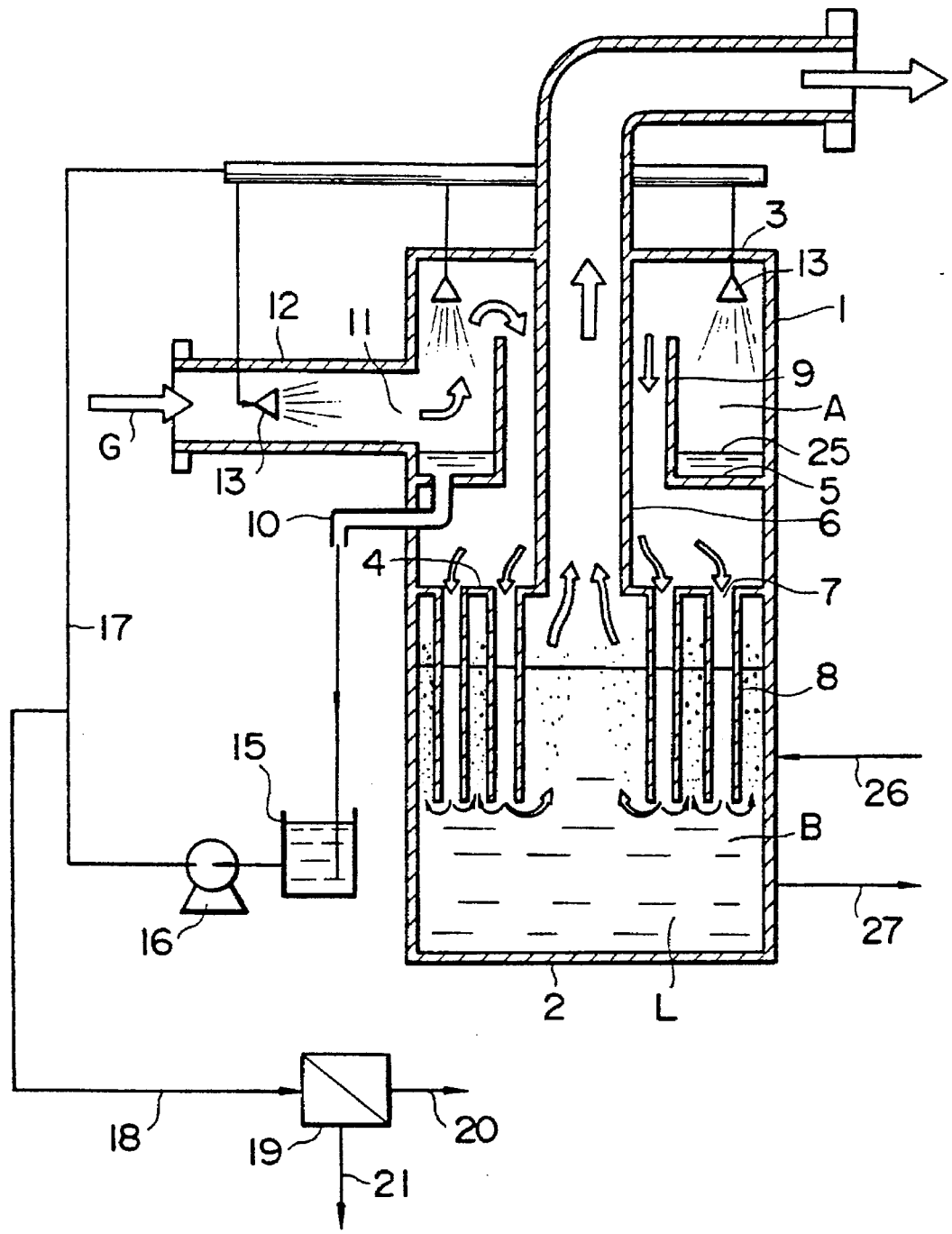
FIG. 1 is an explanatory diagram showing a longitudinal cross Section of one example of the apparatus of this invention wherein a set of the cooling/dust-eliminating chamber and the chemical treatment chamber is depicted.

In FIGS. 1 and 2 showing one embodiment of the apparatus of this invention, a main body 1 of the apparatus is constructed as a confined container and consists of a dust-eliminating chamber A for a waste gas occupying the upper half of the container and a chemical treatment chamber B for treating the dust-free waste gas occupying the lower half of the container. The dust-eliminating chamber A has a top plate 3 on its upper end and a cylindrical perpendicular bulkhead 9 spaced from and below the top plate. A collecting plate 5 for a cooling liquid is horizontally interposed between the lower end of the bulkhead 9 and the side wall of the chamber A. The cylindrical perpendicular bulkhead 9 may have a cross section in the form of a circle, semi-circle, square, rectangle or like shape. The dust-eliminating chamber A has a side opening 11 for the waste gas to which an inlet 12 for the waste gas is connected. The uppermost end of the opening 11 is positioned below the upper end of the cylindrical perpendicular bulkhead 9 while the lowermost end of the opening 11 is positioned above the collecting plate 5. An effluent pipe 10 provides a drain for the cooling liquid through the bottom of the collecting plate 5. The inlet 12 may be tangentially mounted to the side wall whereby the flow of the waste gas may ascend in the dust-eliminating chamber while swirling so that the contact time of the droplets of the cooling liquid with the waste gas may be prolonged to enhance the dust-eliminating effect and the cooling effect. A horizontal bulkhead 4 is interposed between the dust-eliminating chamber A and the chemical treatment chamber B, and is provided with a number of holes 7 from which gas-dispersing pipes 8 extend downwards and provide communication between chambers A and B. The horizontal bulkhead 4 also has a central opening and a discharge pipe 6, for discharge of the treated waste gas arranged in the central open part, extending upwards through the inside of the cylindrical perpendicular bulkhead 9 and through the top plate 3. The lower ends of the gas-dispersing pipes terminate at a distance from the bottom plate 3 of the chamber B. The lower ends of the gas-dispersing pipes 8 are preferably positioned 1–10 m above the bottom plate 2. The lower ends of the gas-eliminating pipes 8 are preferably provided with a number of apertures for blowing out the waste gas through a section a certain length (about 5–50 cm) from the lower end so that the waste gas may be released in a horizontal direction through these lower sections.

One or more sprayers 13 for the cooling liquid are mounted on the inside of the inlet 12 for the waste gas and/or in the chamber A above the collecting plate 5. The effluent pipe 10 is connected to a reservoir tank 15 which is connected to the sprayers 13 through a circulation pump 16 and a pipeline 17. A pipeline 18 joined to the pipeline 17 is connected to a dust-separator 19. A pipeline 20 is a waste liquid pipe while 21 represents the dust separated as solids. The chemical treatment chamber B is provided on the side wall thereof with a liquid inlet 26 for supplying the absorbing liquid and a liquid outlet 27 for discharging the absorbing liquid.

For carrying out the treatment of a waste gas containing dusts and chemical contaminants by using the apparatus shown in FIGS. 1 and 2, for example, a high temperature waste gas (smoke) is introduced into the dust-eliminating chamber A through the inlet 12, and at the same time, a cooling liquid is sprayed from the sprayers 13 in the chamber A. The high temperature waste gas is contacted with the droplets of the cooling liquid and cooled and simultaneously humidified. Most of the dust contained in the waste gas is captured by the droplets of the cooling liquid. The flow of the waste smoke containing the droplets of the cooling liquid collides against the perpendicular bulkhead 9 and is thereby converted into an ascending flow. On the other hand, the droplets sprayed from the sprayer 13 fall downwards in the space of the chamber A onto the collecting plate 5 to form a pool 25. As the velocity of the ascending flow is normally as slow as 1–5 meters/sec, a part of the dust entrained in the flow fall by its own weight together with the droplets of the cooling liquid onto the collecting plate 5 where the dust is captured within the pool 25. In prior practice, dust in the form of microdroplets contained in a high temperature waste smoke has proven difficult to separate from gas. In the case of this invention, however, dust is brought into contact with droplets of the cooling liquid formed by spraying and captured within the droplets to form coarse particles which easily drop, under the influence of gravity, by their own gained weight with an increasing velocity to the pool 25. In the space of the chamber A, the velocity of the waste gas moving in the horizontal direction is as slow as 1–5 meters/sec so that no sputtering phenomenon of the droplets is observed and the waste gas is efficiently separated from the droplets. In the interest of efficiency of contact with the waste gas and the efficiency of separation of the droplets from the waste gas, it is desirable to limit the mean particle size of the droplets of the cooling liquid sprayed from the sprayer to 400–4000 um.

The cooled and dust-free waste gas from which the droplets of the cooling liquid have been separated reaches the upper end opening of the cylindrical perpendicular bulkhead 9 and flows downwards through the gas-dispersing pipes 8 depending from the horizontal bulkhead 4 and into an absorbing liquid L in the chemical treatment chamber B where the gas is contacted with the absorbing liquid L to eliminate the chemical contaminants contained in the gas by absorption. In the case where the chemical contaminants contained in the gas include sulfur oxide compounds and the absorbing liquid is lime milk, the sulfur oxide compounds react with calcium hydroxide in the lime milk to form gypsum. The waste gas from which the chemical contaminants have been eliminated is discharged out of the apparatus through the discharge pipe 6. As the waste gas to be introduced into the chemical treatment chamber B is well cooled, dust-free and contains substantially no droplets of the cooling liquid, the absorbing liquid L is less changed by the waste gas.

The pool 25 of the cooling liquid on the collecting plate 5 is introduced into the reservoir tank 15 through the effluent pipe 10 and then recycled to the sprayers 13 through the circulation pump 16 and the pipeline 17. A part of the cooling liquid is taken out through the pipeline 18 and conveyed to the dust-separator 19 where the dust in the cooling liquid is removed at 21 while the waste water is discharged through the pipe 20. Fresh cooling water is supplied to the reservoir tank 15 to compensate for the amount lost by evaporation and through the pipe 20.

Various modifications can be made when a high temperature waste gas is brought into contact with the droplets of the cooling liquid. For example, the cooling liquid need not always be sprayed into both the inlet 12 and the chamber A, but, rather, may be sprayed into one alone. Further, the number of the sprayers in the chamber A can be reduced by effecting substantially all of the cooling of the waste gas in the inlet 12.

Spraying of the cooling liquid into the chamber A is carried out not only for cooling the waste gas but also for washing solids off of the perpendicular bulkhead 9, which solids form by solidification of a viscous liquid containing dusts separated from the waste gas. The bulkhead is kept clean by being wetted uniformly with the cooling liquid.

The total amount of spray of the cooling liquid for cooling the waste gas can properly be determined by taking the amount of high temperature waste gas to be treated, the temperature of the waste gas and the temperature of the cooling liquid, etc. into consideration. The ratio of the amount of liquid spray/the amount of high temperature waste gas is suitably about 0.5–5 on a weight basis. In order to contact dust in the high temperature waste gas intimately with the droplets of the cooling liquid so that the dust may be sufficiently removed and the gas may be sufficiently cooled, the upper end of the opening of the bulkhead 9 is preferably positioned 250–1500 mm higher than the uppermost end of the inlet 11 for the waste gas. Although the bulkhead 9 is open at its upper end, it may alternatively have a side opening through its circumferential surface. The opening on the side may be the shape of a circle, triangle, square, etc. The upper end of the opening of the bulkhead 9 is preferably positioned at a distance of 300–3000 mm lower than the top plate of the chamber A.

In the apparatus shown in FIGS. 1 and 2, the ratio of the area P, i.e. the total area of the horizontal bulkhead 4 (cross sectional area of the container) minus the area of the central opening (cross sectional area of the perpendicular bulkhead 9) to the area Q, i.e. the area of the central opening (cross sectional area of the discharge pipe 6), P/Q is desirably 1–5 in order to maintain the efficiency of cooling of the waste gas and the efficiency of separation of the droplets of the cooling liquid from the waste gas at high levels and to minimize the size of the apparatus. In the value of the ratio P/Q is smaller than 1, the ascending velocity of the waste gas in the chamber A becomes excessive and the efficiency of separation of the droplets of the cooling liquid from the waste gas becomes poor so that a substantial amount of the droplets will accompany the waste gas and enter into the absorbing liquid L. On the other hand, if the value of the area ratio P/Q exceeds 5, the flow rate of the gas descending through the gas-dispersing pipes 8 will be excessive so that the loss in gas pressure will be increased. The diameter of each gas-dispersing pipe 8 is normally 5–50 cm.

Figure 3:
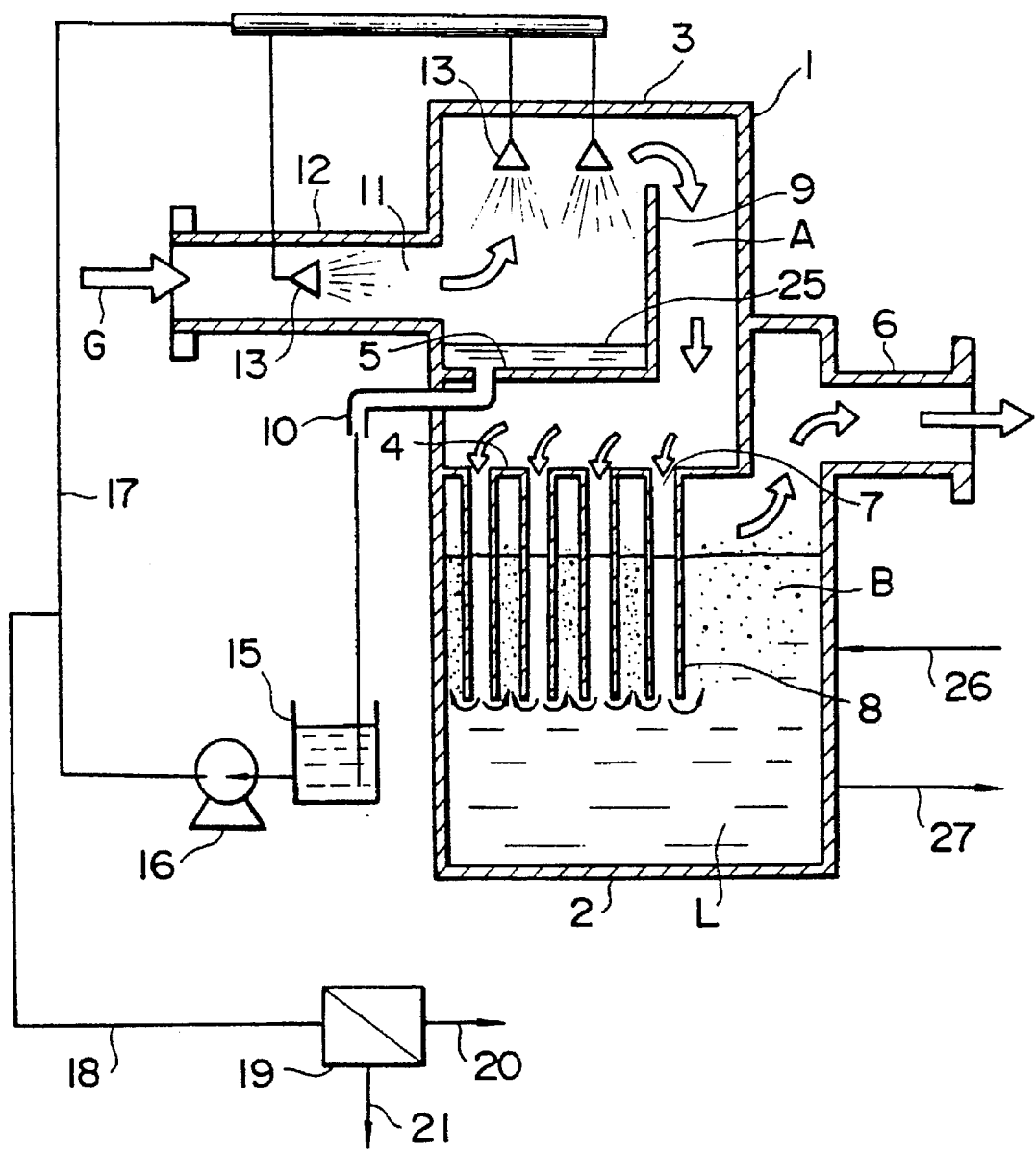
FIG. 3 is an explanatory diagram showing a longitudinal cross section of another embodiment of the apparatus of this invention wherein a set of the cooling/dust-eliminating chamber and the chemical treatment chamber is shown.

In FIGS. 3 and 4, the apparatus has substantially the same structure as in the apparatus shown in FIGS. 1 and 2 except that the perpendicular bulkhead 9 is a flat panel rather than a cylinder and the discharge pipe 6 is on the upper side wall of the chamber B instead of the top plate. The reference numerals used in FIGS. 3 and 4 correspond to the same reference numerals used in FIGS. 1 and 2. The method for operating the apparatus shown in FIGS. 3 and 4 is the same as in the case of FIGS. 1 and 2.

Figure 5:
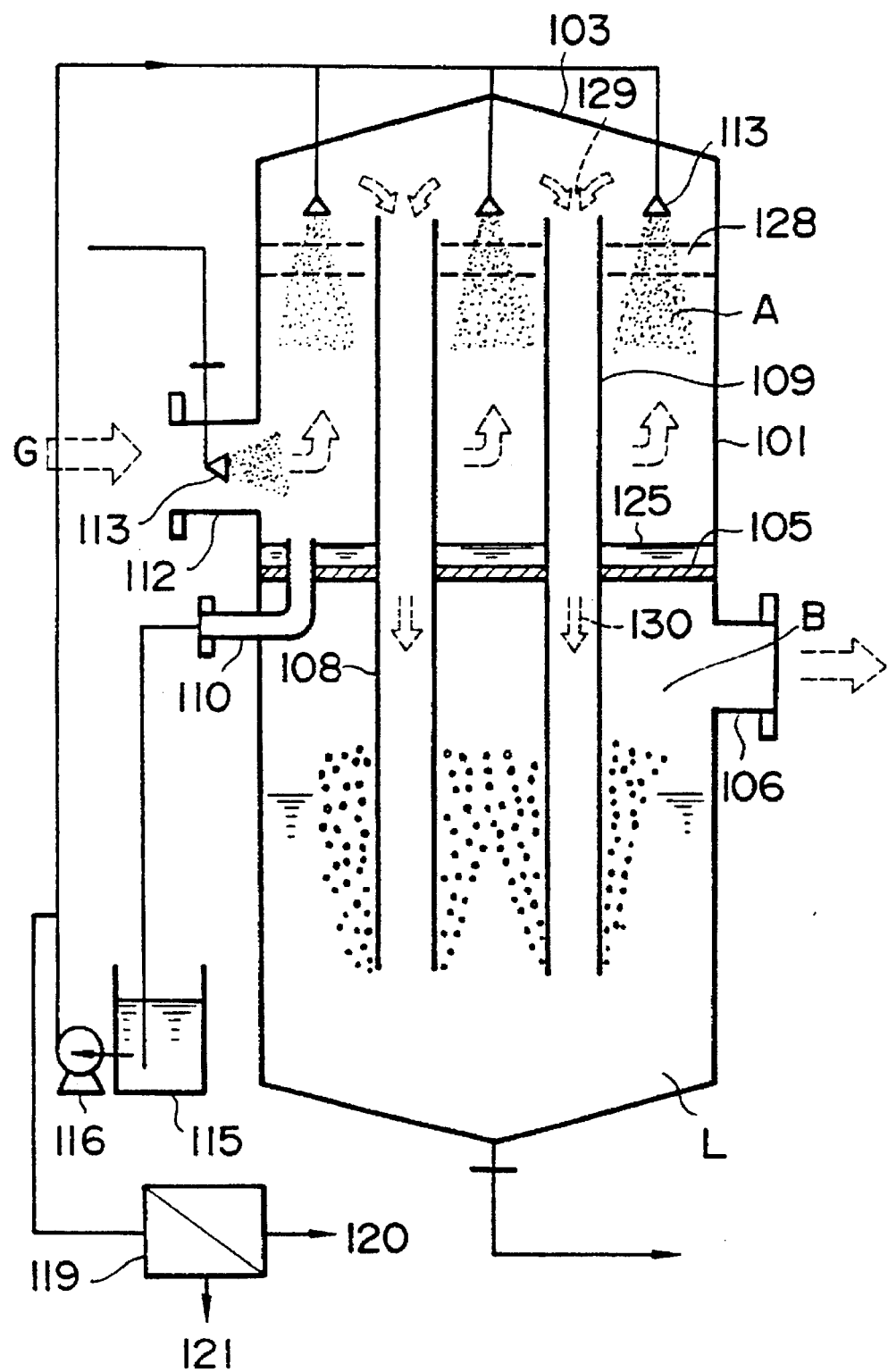
FIG. 5 is an explanatory diagram showing a longitudinal cross section of still another embodiment of the apparatus of this invention wherein the cooling/dust-eliminating chamber is depicted.

FIG. 5 shows still another embodiment of the apparatus of this invention. In FIG. 5 the apparatus includes a container or tank 101 as a main body having, in the upper portion of its sidewall, an inlet 112 for a stream of a hot waste gas. The container is equipped in its upper interior with one or more sprayers 113 for spraying a cooling liquid and in its middle portion with a collecting plate 105 which is mounted transverse to the container 101 is a position spaced below the sprayers and above the bottom of the container. One or more grid supports 128 are horizontally positioned just below the sprayers 113 and fixed to the inner circumferential wall of the container or tank 101.

A waste gas discharge from an industrial plant and still at a high temperatures is introduced through the inlet 112 into the container 101 while water as a cooling liquid is sprayed from the sprayers 113 depending from the top plate 103 of the dust-eliminating chamber A. In the dust-eliminating chamber A, the waste gas is brought into contact with aqueous droplets in a gas-liquid contact space in such a manner that the hot waste gas moving upwards from the inlet 112 is brought into countercurrent contact with the aqueous droplets moving downwards by gravity whereby the hot waste gas is rapidly cooled and dust is captured within the aqueous droplets. A small proportion of sulfur dioxide and small amounts of other water-soluble contaminants in the waste gas, such as HCl, HF, etc. are also absorbed by the aqueous droplets.

The cooled waste gas from which dust and contaminants have been eliminated by intimate contact with the aqueous droplets then enters a chemical treatment chamber B formed in the lower portion of the container 101 just beneath the collecting plate 105, through one or more discharge pipes 108 which extend vertically above and below the collecting plate 105 and in such a manner that the upper end of each pipe terminates above the grid supports 128 at a point sufficiently above the gas-liquid contact space while the lower terminal end of each pipe opens into the absorbing liquid 112.

The aqueous droplets from the sprayers move downwards by gravity and collect on the collecting plate 105. As the velocity of the upwardly moving waste gas is not so high, dust of a relatively large particle size entrained in the gas drops together with the aqueous droplets by gravity and is captured with the water collected in a water pool 125 formed on the plate 105. A part of the relatively finer dust entrained in the waste gas may not be captured with the aqueous droplets but. agglomerates to form coarse particles by wetting with the aqueous droplets. Such agglomerated particles increase in weight and in downward velocity so that they fall into pool 125 where they are captured within the cooling liquid. In this manner, all of the dust contained in the waste gas is captured either by the aqueous droplets or by the pool. In the space just above the pool 125, the velocity of the horizontal component of the flow of the waste gas is rather small so that no sputtering phenomenon occurs with the aqueous droplets and the waste gas is efficiently separated from the aqueous droplets. The water containing the dust is removed from the waste gas, which is stored in the pool 125 overflows through an effluent pipe 110 and is temporarily held in a reservoir tank 115. The cooling liquid thus recovered may be recycled as needed to the sprayers 113 by a circulation pump 116.

The waste gas treated in the dust-eliminating chamber A then passes through the discharge pipes 108 and is injected into the absorbing liquid L. On bubbling through the liquid L chemical contaminants contained in the gas are absorbed. The waste gas thus purified is then released from the container 101 through a discharge pipe 106.

The temperature of the waste gas to be treated is usually within the range of 90°–160° C. and is reduced down to 50° C. or less in the dust-eliminating chamber. If desired, some modification may be made in the cooling treatment of the waste gas usually carried out in the gas-liquid contact space of chamber A.

FIG. 5 shows one modification, wherein there is provided a variant of the dust-eliminating chamber A of FIG. 1. Specifically, the inlet 112 for the hot waste gas is equipped with one or more sprayers 113 for effecting substantial cooling of the hot waste gas prior to introduction of the waste gas into the gas-liquid contact space in the dust-eliminating chamber A. The sprayers 113 used in this variant may be any type of sprayer for a cooling liquid, such as a duct-sprayer of the same type as the sprayers in chamber A or a venturi. The waste gas can be cooled in this manner to substantially a saturated state, i.e. 50°–70° C. The use of this variant is advantageous in that the gas-dispersing pipes 108 may be made of organic resinous material because the pipe 108 are not contacted directly by the waste gas at high temperature (90°–160° C.). Further, the use of this variant offers the advantages that the number of the sprayers 113 mounted to the upper part of the container 101 for cooling the waste gas may be decreased and that, if the number of the sprayers 113 is not decreased, the efficiency of cooling the waste gas can be enhanced.

According to another modification, there is provided a second variant of the dust-eliminating chamber A wherein the sprayers 113 are directed upwardly, for example, from the collection plate 105. In this modification, the flow direction of the cooling liquid is the same as that of the waste gas, i.e. towards the inlets of the gas-dispersing pipers 108 in the upper portion of the chamber A so that the liquid-gas ratio L/G can be comparatively larger. Thus, this variant is advantageous with gases requiring a high degree of cooling.

The amount of the cooling liquid is desirably more than that needed for the dual function (cooling and a combination of wetting and washing), e.g. an amount of 0.5 m$^3$/m$^2$ hr. The cooling liquid in such amount or more is sufficient to wash any solid deposit from the circumferential wall of the gas-dispersing pipes 108.

The inlet 112 for the waste gas may be provided in the side of the container 101 in a tangential direction thereto. In this manner, the waste gas ascends while rotating around the inner surface of the container 101 whereby the contact time between the cooling liquid and the waste gas becomes longer. This mode is particularly advantageous in the case of using the sprayer 113 in the inlet 112. Taking the various conditions into consideration, the size and position of the sprayers can be designed and the number thereof can also be determined to effect cooling of the waste gas. If the waste gas is completely cooled in a place other than the dust-eliminating chamber A, cooling of the waste gas is no longer necessary in the chamber A. However, spraying of the cooling liquid into the chamber A remains more or less necessary since the spraying in the chamber A functions, in addition to cooling, to capture fine particles of dust wetting relatively coarse particles of dust and to wash dust and any other solid matter deposited from the circumferential wall of the gas-dispersing pipes 108. Accordingly, it is desirable to balance the degree of cooling in the chamber A with cooling elsewhere.

The amount of the cooling liquid sprayed can be varied according to the column of the waste gas supplied, the temperature of the waste gas and other factors. Thus, no limitation exists on the amount of the cooling liquid used, and the amount can properly be determined by taking the above various factors and the content of solid matter in the waste gas into consideration. In general, however, the ratio of the amount of the cooling liquid to the amount of a high temperature waste gas is desirably within the range of about 0.5–5 by weight. The opening at the upper end of the gas-dispersing pipes 108 is positioned above the uppermost portion of the inlet 112 preferably by a distance between 250 mm and 1500 mm, inclusive, in order that the waste gas be brought into intimate contact with the droplets of the cooling liquid thereby cooling the gas sufficiently and satisfactorily capturing dust particles entrained in the gas. The openings of the gas-dispersing pipes 108 may be formed at their ends as shown in FIG. 5 or may be formed in the side walls. The gas-dispersing pipes 108 may be any shape in cross section, for example, a circle, a triangle, a square, etc. The opening of the pipes 108 is desirably positioned below the top plate 103 by a distance between 50 mm and 500 mm, inclusive.

The gas-dispersing pipes 108 may be of any material which is inert to the waste gas and stable to a temperature up to about 180° C. For example, a glass tube, a porcelain pipe, or a metal pipe such as a stainless steel pipe can be used without problem. In embodiments where the waste gas can be cooled significantly prior to being introduced into the chamber A, however, a plastic pipe such as one made of polyvinyl chloride or polyolefin can be used as the pipes 108.

It is preferable in the present invention that the ratio of total cross sectional area X of the gas-dispersing pipes to the surface area Y of the collecting plate exclusive of the openings for the gas-dispersing pipes, i.e. X/Y, be within the range of 1/20–1/1. If the ratio X/Y is smaller than 1/20, the size of the apparatus required to treat a great amount of a waste gas will be so large as to make itself economically unattractive. On the other hand, if the ratio X/Y is larger than 1/1, the ascending velocity of a waste gas will be too high to attain a high gas/liquid separation efficiency.

The position of the collecting plate 105 in the container 101 is generally determined by taking into account various operation parameters such as the amount of a high temperature waste gas to be treated, the amount of a cooling liquid sprayed, etc. For example, the collecting plate 105 is preferably mounted in the container 101 at a position below the sprayers 113 and at a distance of 300 mm from the lowermost end of the inlet 112 for operation in a case where a waste gas having a temperature of 130°–160° C. is supplied at a superficial velocity of 1.0–3.0 m/sec, based on the area of the collecting plate, while a cooling liquid having a temperature of 60° C. is sprayed at a rate of 1.2 m³/m² hour based on the cross-section of the container, i.e. per area of the collecting plate.

The cooling liquid in the pool 125 can be recycled for use as a cooling liquid for the waste gas. On recycling of the cooling liquid, it overflows through the effluent pipe 110 when the amount of the cooling liquid in the pool 125 exceeds a level equal to the height of the effluent pipe 125. The overflowing liquid is then held temporarily in the reservoir tank 115 where the liquid may be cooled with a cooling device (not shown) and/or may be filtered by the aid of a filtering device to remove solid matter captured within the liquid. When using a filtering device, the cooling plate 105 may be slightly inclined to prevent any deposition of solid matter on the plate 105. Such cooling device and/or filtering device may be provided, if desired, on the collecting plate 105 itself or in the line through which the overflowing liquid is conveyed to the reservoir tank 115. A part of the liquid may be taken out without being recycled to the sprayers 113 and subjected to liquid/solid separation in any type of separator 119 where the solid matter such as dust is separated and discarded through line 121 while the dust-free liquid is also discharged as an effluent through line 120.

In the chemical treatment chamber B, the dust-free cooled waste gas is bubbled into the absorbing liquid L. The waste gas, if it contains sulfur dioxide as the chemical contaminant, is completely desulfurized in this chamber B by absorption of the sulfur dioxide contained in the gas into the absorbing liquid L such as lime milk while the waste gas ascends in the liquid L as small bubbles whereby a dispersion of industrially pure gypsum, for example, is produced as a by-product. The gas thus purified is collected in the upper space of the chamber B and discharged out of the container 101 through the exhaust pipe 106 while the dispersion of gypsum is discharged as such from the bottom of the container 101. Calcium sulfite initially formed is naturally auto-oxidized to form a slurry of gypsum or positively oxidized by blowing oxygen or air thereinto to speed the oxidation.

Figure 6:
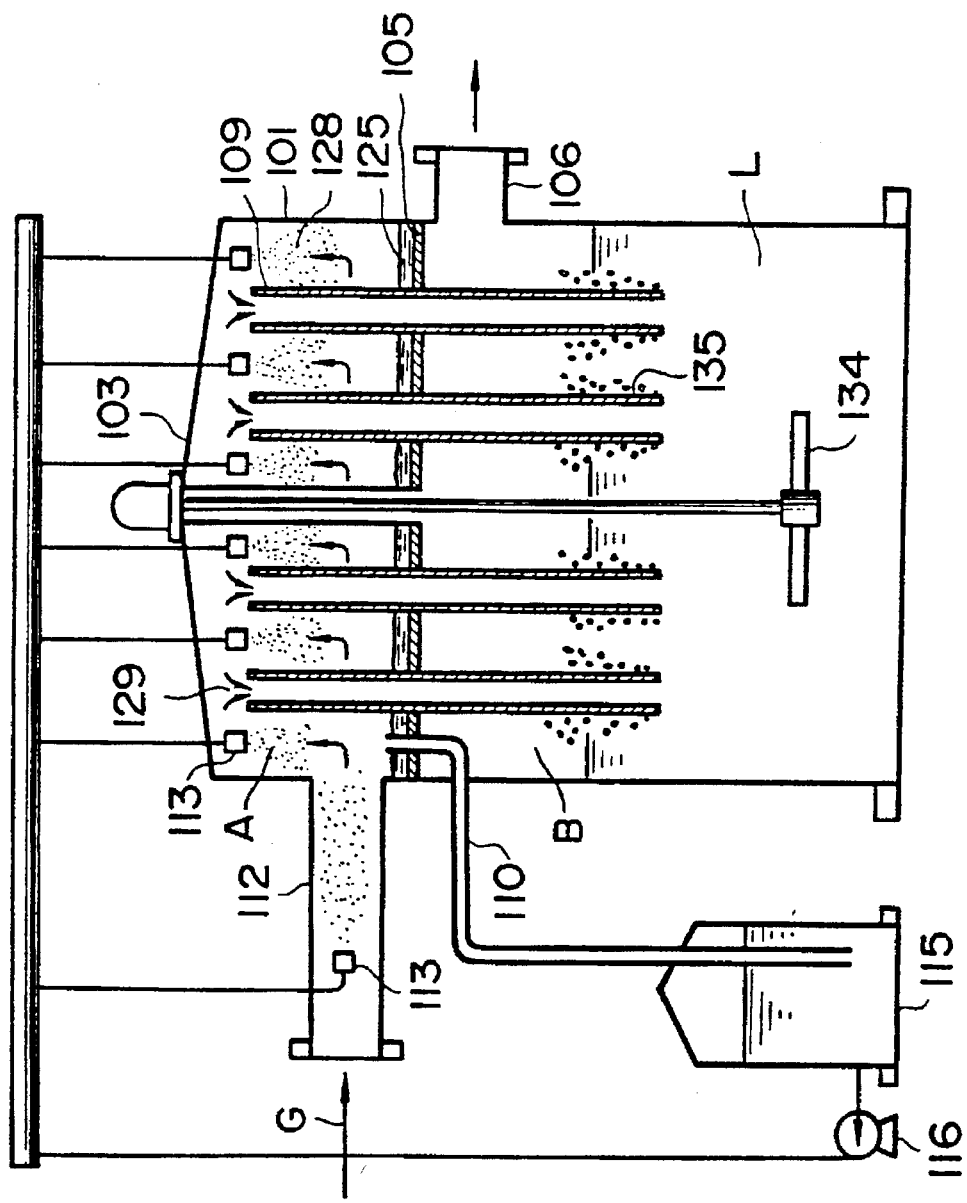
FIG. 6 is an explanatory diagram showing a longitudinal cross section of a further embodiment of the apparatus of this invention depicted in the same manner as FIG. 5.

FIG. 6 shows another embodiment of the apparatus of this invention for carrying out cooling, dust-eliminating and chemical treatment in a single apparatus. This apparatus wherein the cooling/dust-eliminating chamber A and the chemical treatment chamber B are integrally combined is particularly suitable for carrying out the wet method for desulfurization of a waste gas as disclosed in Japanese Patent Publication No. Sho. 60-4726.

Figure 7:
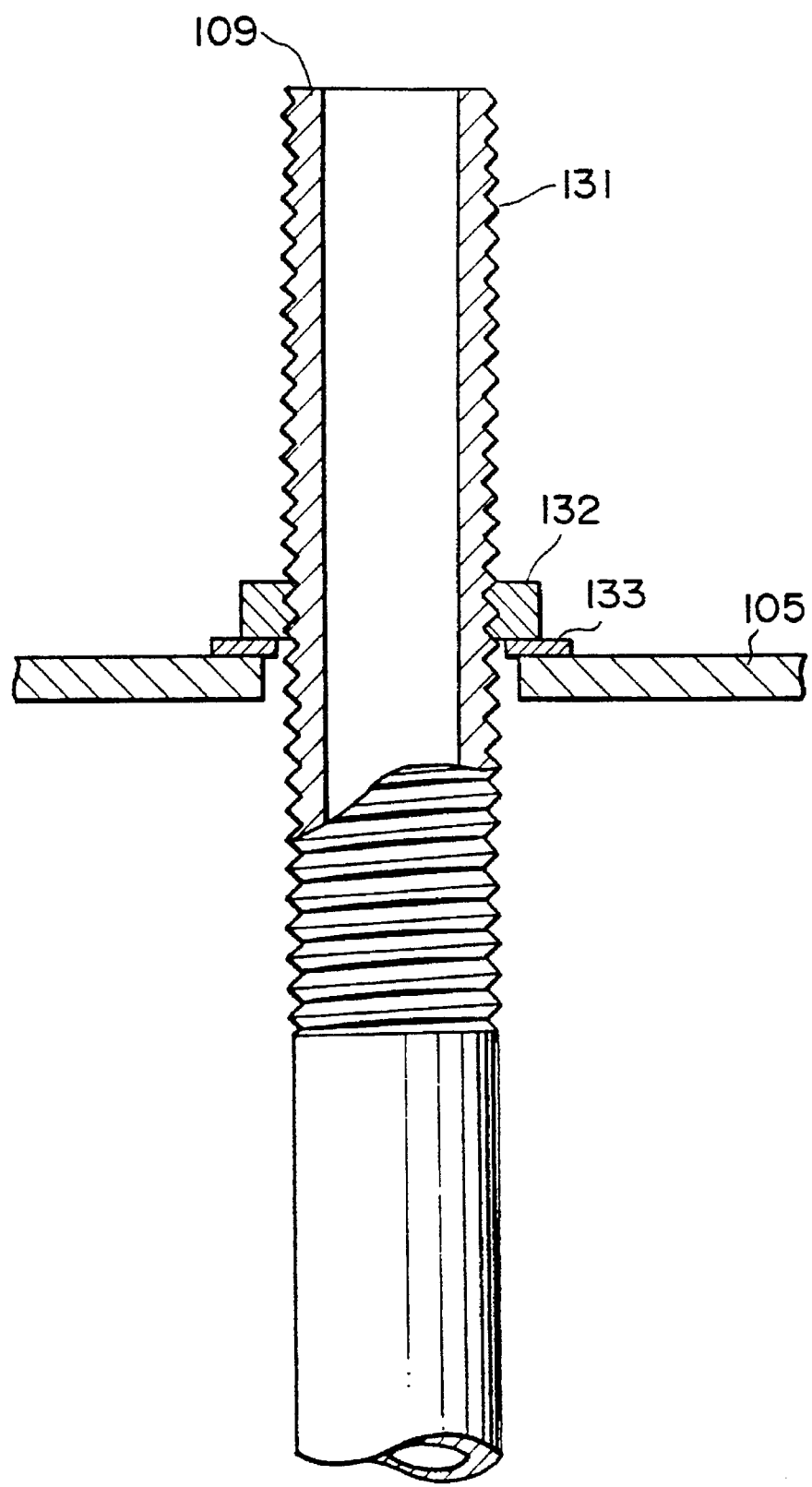
FIG. 7 is an explanatory diagram showing the mounting of the discharge pipe in the collecting plate with provision for adjusting the height.

In FIG. 7, the reference numerals have the same meanings as given in connection with FIG. 5. The container 101 is provided, aligned with its central perpendicular axis, a stirrer 134. A waste gas G having a temperature of 150° C. was supplied through an inlet 112 into the container 101 at a superficial velocity of 1.5 m/sec based on the area of the cross section of column, while water as the cooling liquid at a temperature of 57° C. was sprayed from the sprayers 113. The gas was allowed to ascend in the container as indicated by arrows and brought into intimate contact countercurrently with the sprayed aqueous droplets in the chamber A. The temperature of the waste gas was cooled down to 57.6° C. The aqueous droplets capture the relatively small dust particles, while the wetted relatively larger dust particles fell by gravity into the water 125 on the collecting plate 115. The dust and contaminants contained in the waste gas could be separated from the gas in this manner, and cooling of the gas was also attained simultaneously.

The water in the pool 125 on the collecting plate 105 overflows through an effluent pipe 110 and is temporarily held in a reservoir tank 115. The water in the tank 115 is then recycled by the aid of a circulation pump 116 to the sprayers 113 through a passageway directly or after being passed through a cooling device, and can again be used as a cooling liquid.

In the embodiment shown in FIG. 6, the gas-dispersed pipes 108 for the cooled dust-free waste gas are positioned in such a manner that the openings of the pipes 109 at their upper ends are positioned above the uppermost portion of the inlet 112 by a distance of 600 mm and below the top plate 103 of the container 101 by a distance of 100 mm. The sprayers 113 are positioned as shown in FIG. 6, below the top plate 103 by a distance of 200 mm and in the internal space of the inlet 112 outside the container 101, respectively.

The waste gas introduced from the inlet 112 impinges against the outer walls of a number of the gas-dispersing pipes 109 standing upright whereby dust entrained in the gas also impinge together with the aqueous droplets against the outer walls by the force of inertia and are thus separated effectively from the waste gas. After the cooled waste gas has been separated from solid matter in the chamber A between the collecting plate 105 and the top plate 103 of the container 101, the efficiency of the gas/liquid separation upon reaching the inlets of the gas-dispersing pipes 109 is usually higher than about 98%.

A grid (not shown) supporting a number of the sprayers 113 may also support a number of the gas-dispersing pipes 109 which function in the chemical treatment chamber B as gas-injection pipes, so as to prevent vibration of the pipes by flow of the absorbing liquid L. In the chamber B, the pipes 109 are preferably perforated over a certain distance from their lower ends to facilitate blowing of the gas into the absorbing liquid L. In order to enhance absorption of chemical contaminants contained in the gas by the absorbing liquid L, a stirrer 134 is preferably used for stirring the liquid L. The gas thus purified is discharged out of the container 111 through the exhaust pipe 6 directly after being passed through a mist-eliminator (not shown).

FIG. 7 illustrates the manner in which a gas-dispersing pipe 109 is mounted in the collecting plate, with provision for adjustment of height. Specifically, the gas-dispersing pipe 109 is threaded on its outer circumferential wall over a given distance from its upper end down. The threads 131 on the gas-dispersing pipe mate engageably with the internal threads of a disk 132. A given number of openings are formed in the collecting plate 105 by boring, through which the gas-dispersing pipes 109 extend. In actual use, the pipes are mounted in the collecting plate 105 using a washer 133 and the disk 132. The height of the upper end of the gas-dispersing pipes 109 above the collecting plate 105 and simultaneously the depth of the lower end of the pipes in the absorbing liquid can easily be adjusted by turning the disk 132 relative to the pipe. A packing (not shown) may be interposed, if desired, between the disk 132 and the washer 133 or between the washer 133 and the collecting plate 105 to prevent any leakage of cooling liquid from the collecting plate 105. The degree of cooling and dust-elimination can freely be controlled by adjusting the height of the upper end of the pipes 109 from the collecting plate 105.

According to the method of this invention, cooling of a waste gas, dust removal from a waste gas and absorption of chemical contaminants contained in a waste gas can be effected simultaneously and at a high efficiency. The apparatus of this invention includes in a single container, two chambers for effecting cooling/dust-elimination and absorption of chemical contaminants and is capable of operating these different steps continuously at the same time. Accordingly, this apparatus is efficient and economically advantageous since the conventional desulfurization apparatus necessitates an independent cooling or dust-eliminating device in addition to the desulfurization device. One advantage of this invention is that, as the area of the collecting plate is sufficient for the amount of a waste gas introduced and as a pool of the cooling liquid is formed on the collecting plate, the cooling liquid absorbs the descending droplets capturing relatively small dust and wetted relatively larger dust particles, whereby dust-elimination is promoted. It is also an advantage of this invention that the apparatus can be minimized in size and the efficiency of the chamber A can be increased by proper design for the ratio of the total cross sectional area of the gas-dispersing pipes to the surface area of the collecting plate exclusive of the openings for the gas-dispersing pipes. It is a yet additional advantage of this invention that the positions of the gas-dispersing pipes can be properly adjusted in accordance with various factors such as the temperature and the amount of a waste gas introduced and the temperature and the amount of cooling liquid sprayed because the gas-dispersing pipes are adjustably mounted on the collecting plate in such manner that the upper opening of each gas-dispersing pipe is positioned higher than the uppermost portion of the gas inlet and at a distance above the collecting plate. It is a further advantage of the apparatus of this invention that both the efficiency of cooling the waste gas and the efficiency of dust-elimination can be enhanced significantly so that increase in the amount of water or dilution of the absorbing liquid in the chemical treatment chamber can be prevented.

If the chemical contaminants contained in a waste gas are substantially sulfur oxide compounds, a suspension of lime or limestone can be used as the absorbing liquid. In this case, a further advantage is achieved by the present invention in that various impurities contained in the waste gas, for example, dust, acidic contaminants such as HCl, HF, etc. are eliminated in the dust-eliminating chamber and so the quality of gypsum as by-product can be improved.

Accordingly, the method and apparatus of this invention can be widely used for treating various kinds of waste gas containing dust and chemical contaminants and may also be used for the cleaning of a gas containing small or large amounts of dust and liquid droplets without cooling the gas whereby such dust and liquid droplets can be separated from the gas.

The invention may be embodied in other or specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An apparatus for the treatment of a waste gas containing dust and chemical contaminants, said apparatus comprising:

a vertical column defined by a top, bottom and vertical cylindrical side wall with a side inlet for admission of a flow of the waste gas to be treated;

at least one liquid sprayer, depending from said top, for spraying droplets of a cooling liquid countercurrently into said waste gas flow;

interior wall means within said column, spaced from said side wall, for redirecting the waste gas flow first into a vertically ascending flow for the countercurrent contact with the droplets of cooling liquid and then into a vertically descending flow;

a dust-eliminating chamber provided in an upper portion of said column and defined by a collecting plate located beneath said one liquid sprayer for collecting said droplets of cooling liquid and dust and by said interior wall means, said one liquid sprayer being mounted within said column to direct said droplets of cooling liquid downward into said dust-eliminating chamber for cooling said waste gas and for removing dust from said gas;

a chemical treatment chamber, provided in said column below said dust-eliminating chamber and separated therefrom by said collecting plate, for containing a liquid absorbent for said chemical contaminants, for receiving said vertically descending flow and for contacting said vertically descending flow with said liquid absorbent to convert said waste gas into a treated gas by absorption of the chemical contaminants into the liquid absorbent;

a gas outlet for exit of the treated gas from said column; and a liquid effluent outlet for discharge of the dust and cooling liquid collected on said collecting plate from said vertical column.

2. The apparatus of claim 1 wherein said interior wall means for redirecting said gas flow is a vertical wall.

3. The apparatus of claim 1 wherein said interior wall means for redirecting said gas flow is a plurality of vertical pipes.

4. The apparatus of claim 1 wherein said inlet is horizontal.

5. An apparatus according to claim 1, further comprising a horizontal bulkhead separating the dust-eliminating chamber from the chemical treatment chamber and a plurality of downwardly extending gas-dispersing pipes for transfer of the waste gas from said dust-eliminating chamber into said chemical treatment chamber.

6. An apparatus for the treatment of a waste gas containing dust and chemical contaminants, said apparatus comprising:

a vertical column defined by a top plate, a bottom and a vertical cylindrical side wall with a side inlet for admission of a horizontal flow of the waste gas to be treated;

a dust-eliminating chamber defined by (1) the interior of said column, (2) a vertical plate spaced from said side Wall and extending upwardly within the column from a lower end below said side inlet to an upper end above said side inlet and spaced from said top plate thereby defining a gap therebetween and a vertical flow path for the waste gas and (3) a liquid collecting plate connecting the lower end of said vertical plate to the side wall of said column, said vertical flow path including a vertically ascending flow path and a vertically descending flow path;

a chemical treatment chamber in said column beneath said dust-eliminating chamber for holding a liquid absorbent for the chemical contaminants and for contacting waste gas exiting said dust eliminating chamber with the liquid absorbent to convert the waste gas into a treated gas by absorption of the chemical contaminants into the liquid absorbent;

a horizontal bulkhead separating said dust-eliminating chamber from said chemical treatment chamber and having a plurality of openings with gas dispersing pipes depending downward from said openings into said chemical treatment chamber;

liquid spray means, mounted within said column, for spraying droplets of a cooling liquid downwardly into said dust-eliminating chamber for countercurrent contact with the waste gas in said vertically ascending flow to cool and to remove dust from the waste gas;

gas discharge means for discharging treated waste gas from said column; and liquid discharge means for discharging from said column dust and liquid collected on said liquid collecting plate.

7. An apparatus for the treatment of a waste gas containing dust and chemical contaminants, said apparatus comprising:

a vertical column defined by a top plate, a bottom and a vertical, cylindrical side wall with a side inlet for admission of a horizontal flow of the waste gas to be treated;

a dust-eliminating chamber in the form of an annular tray extending around the inside circumference of said column in communication with said side inlet, thereby receiving the horizontal flow of waste gas; said annular tray having a vertical, cylindrical inner wall spaced from said side wall and an annular liquid collecting plate joining said inner wall to said side wall and forming the floor of said tray, the lowermost point of said inlet being spaced above said liquid collecting plate, said inner wall having its upper end spaced from said top plate to define a first gap therebetween, where waste gas entering through said side inlet is redirected first vertically upward and then vertically downward by said inner wall;

a chemical treatment chamber in said column below said dust-eliminating chamber for holding a liquid absorbent for the chemical contaminants and for contacting waste gas existing said dust eliminating chamber with the liquid absorbent to convert the waste gas into a treated gas by absorption of the chemical contaminants into the liquid absorbent;

a gas discharge pipe for venting treated gas from said chemical treatment chamber, said gas discharge pipe rising from said chemical treatment chamber through the center of said inner wall and defining an annular second gap therebetween and an annular third gap with said side wall;

an annular horizontal wall forming the top of said chemical treatment chamber and closing the annular third gap between said side wall and said gas discharge pipe;

a plurality of gas discharge pipes depending from openings in said annular horizontal wall and extending downward into chemical treatment chamber for bubbling waste gas exiting said dust-eliminating chamber through the absorbent liquid contained in said chemical treatment chamber;

at least one sprayer, mounted within said column above said annular tray and depending from said top plate, for countercurrently spraying a cooling liquid downward into the waste gas moving vertically upward within said dust-eliminating chamber, thereby cooling and removing dust from the waste gas;

liquid effluent means for removing from the column water and dust collected on said liquid collecting plate; and whereby waste gas flow entering horizontally through said side inlet is redirected vertically upward in the column by said inner wall while it is scrubbed by the sprayed cooling liquid, the spray droplets and wetted dust falling by gravity onto said liquid collecting plate, the waste gas reversing direction at the top plate of the column and flowing through said first gap and vertically downward through said annular second gap and gas dispersing pipes and into the liquid absorbent, then exiting the column through said gas discharge pipe as a dust-free, decontaminated gas.

8. An apparatus for the treatment of a waste gas containing dust and chemical contaminants, said apparatus comprising:

a vertical column defined by a top, a bottom and a vertical cylindrical side wall, said vertical column being divided into an upper dust-eliminating chamber and a lower chemical treatment chamber by a horizontal liquid collecting plate, said chemical treatment chamber holding a liquid absorbent for said contaminants;

gas inlet means for introducing the waste gas into said upper dust-eliminating chamber;

at least one vertical pipe means for passing the waste gas from said dust-eliminating chamber into said liquid absorbent in said chemical treatment chamber, extending through said horizontal liquid collecting plate downward to a lower end below the level of absorbent liquid and upward to an upper end above said gas inlet means and spaced from said top to define a gap therebetween, whereby the waste gas entering said dust-eliminating chamber flows first vertically upward, through said gap and then vertically downward through said vertical pipe and into said chemical treatment chamber at least one liquid sprayer, mounted within said vertical column depending from said top above said horizontal liquid collecting plate, for spraying the cooling liquid countercurrently, downwardly into waste gas rising within said dust-eliminating chamber;

gas discharge means for discharging gas exiting said chemical treatment chamber from said column; and liquid discharge means for removing from said column the dust and liquid collected on said liquid collecting plate.

* * * * *

UNITED STATES PATENT AND TRADEMARK OFFICE
CERTIFICATE OF CORRECTION

PATENT NO.  : 5,645,802
DATED       : July 8, 1997
INVENTOR(S) : YANAGIOKA et al It is certified that error appears in the above-indentified patent and that said Letters Patent is hereby corrected as shown below:

<u>IN THE TITLE</u>:
 Title page & Col. 1, line 3
   "DISTS" should read --DUSTS--.

Col. 4, line 42, "tile" should read --the--.

Signed and Sealed this

Thirtieth Day of June, 1998

*Attest:*

BRUCE LEHMAN

*Attesting Officer*   *Commissioner of Patents and Trademarks*